(12) United States Patent
Van Bommel et al.

(10) Patent No.: US 12,493,194 B2
(45) Date of Patent: Dec. 9, 2025

(54) HIGH BRIGHTNESS LIGHT SOURCE PROVIDING LIGHT USING TWIN PHOSPHORS

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 387 days.

(21) Appl. No.: 18/036,339

(22) PCT Filed: Nov. 24, 2021

(86) PCT No.: PCT/EP2021/082804
§ 371 (c)(1),
(2) Date: May 10, 2023

(87) PCT Pub. No.: WO2022/112319
PCT Pub. Date: Jun. 2, 2022

(65) Prior Publication Data
US 2024/0004210 A1    Jan. 4, 2024

(30) Foreign Application Priority Data
Nov. 27, 2020    (EP) .................................... 20210206

(51) Int. Cl.
*G02B 27/28* (2006.01)
*F21V 9/14* (2006.01)
(Continued)

(52) U.S. Cl.
CPC .............. *G02B 27/283* (2013.01); *F21V 9/14* (2013.01); *F21V 9/30* (2018.02); *G03B 21/204* (2013.01); *G03B 21/2073* (2013.01)

(58) Field of Classification Search
CPC ........... G02B 27/283; F21V 9/14; F21V 9/30; G03B 21/204; G03B 21/2073; H10H 20/855; F21Y 2115/30
See application file for complete search history.

(56) References Cited

U.S. PATENT DOCUMENTS 10,474,016 B2    11/2019  Akiyama
11,822,221 B2 *  11/2023  Guo ........................ G03B 33/08
(Continued)

FOREIGN PATENT DOCUMENTS

CN    108533980 B    6/2020
CN    111578164 A    8/2020
(Continued)

OTHER PUBLICATIONS

Oh Ji Hye, et al.: "Polarized With Light from LEDs Using Remote Phosphor Layer Sandwiched Between Reflective Polarizer and Light-Recycling Dichroic Filter", Optics Express, vol. 21, No. S5, Jul. 15, 2013, p. A765.
(Continued)

*Primary Examiner* — Tuyen K Vo

(57) ABSTRACT

The invention provides a light generating system (1000) comprising one or more light generating devices (100), a first luminescent material element (1210), a second luminescent material element (1220), first polarization optics (410), second polarization optics (420), and third optics (430), wherein: (a) the one or more light generating devices (100) are configured to generate device light (101); (b) the first luminescent material element (1210) comprises a first luminescent material (210) configured in a light receiving relationship with one or more of the one or more light generating devices (100) and configured to convert at least part of the received device light (101) into first luminescent material light (211); (c) the second luminescent material
(Continued)

element (1220) comprises a second luminescent material (220) configured in a light receiving relationship with one or more of the one or more light generating devices (100) and configured to convert at least part of the received device light (101) into second luminescent material light (221); (d) the first polarization optics (410) are configured downstream of the first luminescent material (210) and upstream of the third optics (430); wherein the first polarization optics (410) are configured to provide first luminescent material light (211) having a first polarization; (e) the second polarization optics (420) are configured downstream of the second luminescent material (220) and upstream of the third optics (430); wherein the second polarization optics (420) are configured to provide second luminescent material light (221) having a second polarization different from the first polarization; and (f) the third optics (430) are configured to combine in an operational mode of the light generating system (1000) the polarized first luminescent material light (211) and the polarized second luminescent material light (221); and wherein the third optics (430) comprises a reflective polarizer.

15 Claims, 5 Drawing Sheets

(51) Int. Cl.
*F21V 9/30* (2018.01)
*G03B 21/20* (2006.01)

(56) References Cited

U.S. PATENT DOCUMENTS

| | | | |
|---|---|---|---|
| 2010/0277796 | A1 | 11/2010 | Magarill et al. |
| 2017/0208300 | A1* | 7/2017 | Toyooka ............... H04N 9/3167 |
| 2018/0252993 | A1* | 9/2018 | Akiyama ............. G03B 21/204 |
| 2019/0004409 | A1* | 1/2019 | Nishikawa ........... G03B 21/204 |
| 2019/0391477 | A1* | 12/2019 | Akiyama ........... G03B 21/2073 |
| 2020/0073220 | A1* | 3/2020 | Hoshino ............ G03B 21/2053 |
| 2020/0301266 | A1* | 9/2020 | Nakamura ............. G03B 33/08 |
| 2021/0294201 | A1* | 9/2021 | Suzuki ................. G02B 27/283 |
| 2021/0341823 | A1 | 11/2021 | Nishi et al. |
| 2022/0066301 | A1* | 3/2022 | Yamamoto ........... G03B 21/204 |
| 2022/0299184 | A1* | 9/2022 | Traian ................... F21S 41/635 |

FOREIGN PATENT DOCUMENTS

| | | |
|---|---|---|
| KR | 20130024564 A | 3/2013 |
| WO | 2006124993 A1 | 11/2006 |
| WO | 2016139046 A1 | 9/2016 |
| WO | 2020044999 A1 | 3/2020 |
| WO | 2020137749 A1 | 7/2020 |
| WO | WO-2022084866 A1 * 4/2022 .......... G02B 19/0028 |

OTHER PUBLICATIONS

Li Sensen, et al.: "Incoherent Polarization Beam Combination for Mid-Infrared Semiconductor Lasers", Enhanced and Synthetic Vision 2003: Apr. 21, 2003, Orlando, FL US, SPIE, vol. 11170, May 17, 2019, pp. 111702Z-111702Z.

Yinsheng Zhao, et al.: Mn-ion-enhanced Red Spectral Emission from Yttrium Aluminum Garnet Doped Cerium Phosphor, Chinese Science Bulletin, Science in China Press, BE, vol. 56, No. 35, Dec. 3, 2011, pp. 3866-3870.

Kottaisamy M et al: "Color tuning of Y"3Al"50"1"2:Ce phosphor and their blend for white LEDs", Materials Research Bulletin, Elsevier, Kidlington, GB, vol. 43, No. 7, Jul. 1, 2008 (Jul. 1, 2008), pp. 1657-1663, XP022688175, ISSN: 0025-5408, DOI: 10.1016/J. MATERRESBULL.2007.09.005 [Retrieved on May 26, 2008].

* cited by examiner

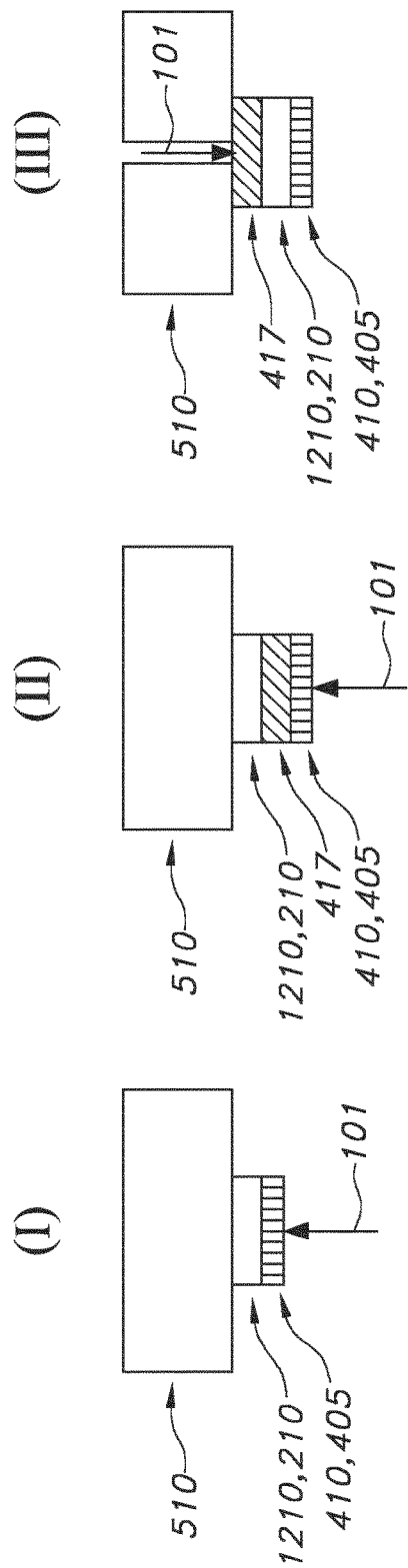
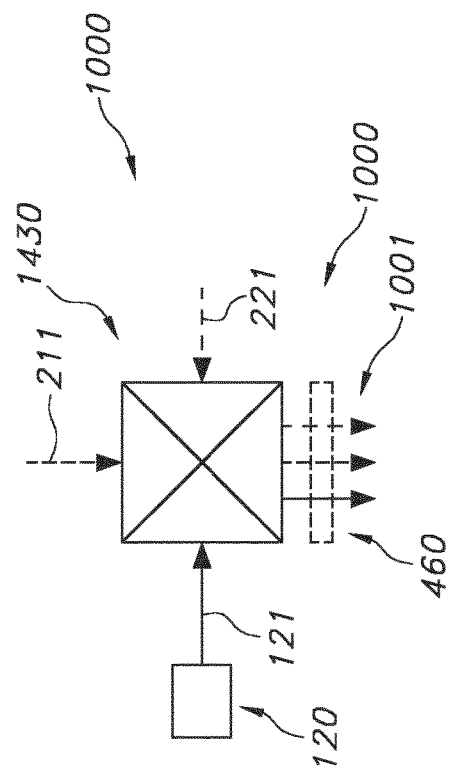
FIG. 2A
FIG. 2B

HIGH BRIGHTNESS LIGHT SOURCE PROVIDING LIGHT USING TWIN PHOSPHORS

CROSS-REFERENCE TO PRIOR APPLICATIONS

This application is the U.S. National Phase application under 35 U.S.C. § 371 of International Application No. PCT/EP2021/082804, filed on Nov. 24, 2021, which claims the benefit of European Patent Application No. 20210206.7, filed on Nov. 27, 2020. These applications are hereby incorporated by reference herein.

FIELD OF THE INVENTION

The invention relates to a light generating system as well as to a light generating device comprising such light generating system.

BACKGROUND OF THE INVENTION

Light combiners are known in the art. US2010/0277796, for instance, describes light combiners and light splitters, and methods of using light combiners and light splitters. US2010/0277796 mentions light combiners and splitters that combine and split, respectively, light of different wavelength spectrums using polarizing beam splitters. The light combiners include arrangements of four polarizing beam splitters, such that three different wavelength spectrums of light can be directed into three of the polarizing beam splitters, and a combined light can be received from the fourth polarizing beam splitter. The light splitters can be the same configuration as the light combiners, but the direction of light travel is reversed to split, rather than combine, light. Polychromatic light can be directed into one of the polarizing beam splitters, and light having three different wavelength spectrums can be received from the other three polarizing beam splitters. The three different wavelength spectrums of light, the combined light, and the polychromatic light can be unpolarized light. US2010/0277796 indicates that the light combiners can be useful as unpolarized white light sources, such as in digital micro-mirror display projection systems. Oh Ji Hye ET AL: "Polarized white light from LEDs using remote-phosphor layer sandwiched between reflective polarizer and light-recycling dichroic filter", Optics Express, vol. 21, no. S5, 15 Jul. 2013 (2013 Jul. 15), page A765 discloses an efficient polarized, white phosphor-converted, light-emitting diode (pc-LED) using a remote phosphor film sandwiched between a reflective polarizer film (RPF) and a short-wavelength pass dichroic filter (SPDF). The on-axis brightness of polarized white light emission of a RPF/SPDF-sandwiched phosphor film over a blue LED, showed greater recovery than that of a conventional unpolarized remote phosphor film over blue LED, due to the recycling effect of yellow light from an SPDF. A polarization ratio of 0.84 was demonstrated for a white LED with an RPF/SPDF-sandwiched phosphor film, in good agreement with the measured results from the RPF-only sample.

SUMMARY OF THE INVENTION

While white LED sources can give an intensity of e.g. up to about 300 lm/mm$^2$; static phosphor converted laser white sources can give an intensity even up to about 20,000 lm/mm$^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

One of the problems that may be associated with such (laser) light sources may be the desire to even further increase the intensity by using multiple sources while preferably obtaining a desirable etendue. Other problems associated with such laser light sources may be the desire to create compact high power devices.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

In a first aspect, the invention provides a light generating system ("system") comprising one or more light generating devices. Further, the light generating system may comprise a first luminescent material element. Yet further, the light generating system may comprise a second luminescent material element. Further, the light generating system may comprise one or more of (i) first polarization optics, (ii) second polarization optics, (iii) and third optics. Especially, in embodiments the light generating system may comprise the first polarization optics, the second polarization optics, and the third optics. In embodiments, the one or more light generating devices are configured to generate device light. Further, especially the first luminescent material element may comprise a first luminescent material configured in a light receiving relationship with one or more of the one or more light generating devices and configured to convert at least part of the received device light into first luminescent material light. Further, especially in embodiments the second luminescent material element may comprise a second luminescent material configured in a light receiving relationship with one or more of the one or more light generating devices and configured to convert at least part of the received device light into second luminescent material light. Yet further, in embodiments the first polarization optics may be configured downstream of the first luminescent material and upstream of the third optics. Especially, the first polarization optics may be configured to provide first luminescent material light having a first polarization. Yet further, the second polarization optics may be configured downstream of the second luminescent material and upstream of the third optics Especially, the second polarization optics may be configured to provide second luminescent material light having a second polarization different from the first polarization. In embodiments, the third optics may be configured to combine in an operational mode of the light generating system the polarized first luminescent material light and the polarized second luminescent material light. Further, especially the third optics may comprise a reflective polarizer. Hence, the invention provides in embodiments a light generating system comprising one or more light generating devices, a first luminescent material element, a second luminescent material element, first polarization optics, second polarization optics, and third optics, wherein: (a) the one or more light generating devices are configured to generate device light; (b) the first luminescent material element comprises a first luminescent material configured in a light receiving relationship with one or more of the one or more light generating devices and configured to convert at least part of the received device light into first luminescent material light; (c) the second luminescent material element comprises a second luminescent material configured in a light receiving relationship with one or more of the one or more light generating devices and configured to convert at least part of the received device light into second luminescent material light; (d) the first polarization optics are configured downstream of the first luminescent material and upstream of the third optics; wherein the first polarization optics are configured to provide first luminescent material light having a first polarization; (e) the second polarization optics are configured downstream of the second luminescent material and upstream of the third optics; wherein the second polarization optics are configured to provide second luminescent material light having a second polarization different from the first polarization; and (f) the third optics are configured to combine in an operational mode of the light generating system the polarized first luminescent material light and the polarized second luminescent material light; and wherein the third optics comprises a reflective polarizer.

With such system, it may be possible to further increase the intensity while preferably obtaining a desirable etendue. Further, a relatively small device may be provided which may be able to provide light with a relatively high intensity. Further, it may be possible to provide white light having a superior quality, especially when using broad band emitting luminescent materials. Especially for laser-based light generating systems, thermal management may be an issue. By having a first and second luminescent material element comprising a ceramic body and that are spatially separated and that are thermally coupled to a thermally conductive element, high intensity visible light may be generated, which intensity is even further increased by combining light beams by means of a reflective polarizer.

As indicated above, the invention provides a light generating system.

The light generating system comprises one or more light generating devices. Each of the one or more light generating devices may comprise a light source.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi-LED chip configured together as a single lighting module.

The light source may have a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi-LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs. In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light source is especially configured to generate light source light having an optical axis (O), (a beam shape) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

As indicated above, in embodiments the light source may be selected from the group of laser diodes and superluminescent LEDs.

In specific embodiments, the light generating device may comprise a plurality of different light sources, such as two or more subsets of light sources, with each subset comprising one or more light sources configured to generate light source light having essentially the same spectral power distribution, but wherein light sources of different subsets are configured to generate light source light having different spectral distributions. In such embodiments, a control system may be configured to control the plurality of light sources. In specific embodiments, the control system may control the subsets of light sources individually. This may apply to one or more of the one or more light generating devices. The one or more light generating devices are especially configured to generate device light. In specific embodiments, the device light may comprise blue light and/or UV light.

In embodiments, the light generating system comprises a single light generating device, of which the device light may be splitted in at least two parts, of which one part is directed to the first luminescent material element and of which another part is directed to the second luminescent material element.

Alternatively or additionally, in embodiments the light generating system may comprise at least two sets of light generating devices, of which the device light of one set is directed to the first luminescent material element and of which the device light of another set is directed to the second luminescent material element. With the latter embodiments, it may be possible to control the different contributions of the luminescent material light in the system light (see also below). Further, with the latter embodiments it may also be possible that a spectral power distribution of the device light of different sets may mutually differ. For instance, this may in embodiments be used to better address different luminescent materials.

In specific embodiments, colors or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

In other specific embodiments, colors or color points of a first type of light and a second type of light may be essentially the same when the respective color points of the first type of light and the second type of light differ with at maximum 0.03 for u' and/or with at maximum 0.03 for v', even more especially at maximum 0.02 for u' and/or with at maximum 0.02 for v'. In yet more specific embodiments, the respective color points of first type of light and the second type of light may differ with at maximum 0.01 for u' and/or with at maximum 0.01 for v'. Here, u' and v' are color coordinate of the light in the CIE 1976 UCS (uniform chromaticity scale) diagram.

In specific embodiments, at least two spectral power distributions of the device light (in at least two respective operational modes) may have centroid wavelengths differing least 10 nm, such as at least 20 nm, or even at least 30 nm, such as a difference selected from the range of 30-200 nm. However, other values may also be possible (see also below).

In (other) specific embodiments, wherein different sets of light generating devices are applied, these may be configured to generate device light having essentially the same spectral power distributions.

The system may further comprise a first luminescent material element and a second luminescent material element. The first luminescent material element and second luminescent material element are especially configured spatially separated. Hence, especially the first luminescent material element and second luminescent material element are distinct elements. They may be configured adjacent to each other. In embodiments they may be configured at a non-zero distance from each other, like at a distance of at least about 100 μm. In specific embodiments, the first luminescent material element and the second luminescent material element are different luminescent bodies.

Especially, the system may be configured such that different beams of device light irradiate the different luminescent material elements. Hence, would one beam be blocked or otherwise not be provided, the other beam may still address the respective luminescent material element. Especially, in embodiments less than 20% of the spectral power of one beam configured to irradiate the first luminescent material element may be received by the second luminescent material element, such as less than 10%, or even less than 5% of the spectral power of the one beam configured to irradiate the first luminescent material element. Likewise, in embodiments less than 20% of the spectral power of another beam configured to irradiate the second luminescent material element may be received by the first luminescent material element, such as less than 10%, or even less than 5% of the spectral power of the one beam configured to irradiate the second luminescent material element.

Each of the luminescent material elements may individually be selected from (i) a luminescent material layer essentially consisting of the luminescent material, (ii) a luminescent material layer comprising a luminescent material and other material, (iii) a luminescent body essentially consisting of a luminescent material, and (iv) a luminescent body comprising a luminescent material, and other material. The luminescent body may especially be a ceramic body. Hence, in specific embodiments at least one of the first luminescent material element and the second luminescent material element may comprises a ceramic body. In alternative embodiments, at least one of the first luminescent material element and the second luminescent material element may comprises a single crystallin body.

Especially, the first luminescent material element may comprise a first luminescent material configured in a light receiving relationship with one or more of the one or more light generating devices and configured to convert at least part of the received device light into first luminescent material light. Further, especially the second luminescent material element comprises a second luminescent material configured in a light receiving relationship with one or more of the one or more light generating devices and configured to convert at least part of the received device light into second luminescent material light.

The term "in a light-receiving relationship" does, as indicated above, not exclude the presence of intermediate optical elements, such as lenses, collimators, reflectors, dichroic mirrors, etc. In embodiments, the term "light-receiving relationship" and "downstream" may essentially be synonyms. The terms "radiationally coupled" or "optically coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material.

The first luminescent material and the second luminescent material may be the same materials (but spatially separated, see above), or may be different materials. Note that the term "luminescent material" may also refer to a plurality of different luminescent materials. Embodiments of luminescent materials are described below.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex} < \lambda_{em}$), though in specific embodiments the luminescent material may comprise up-converter luminescent material, i.e. radiation of a larger wavelength is converted into radiation with a smaller wavelength ($\lambda_{ex} \geq \lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials. Examples of possible luminescent materials are indicated below.

In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein x1+x2+x3=1, wherein x3>0, wherein 0<x2+x3≤0.2, wherein y1+y2=1, wherein 0≤y2≤0.2, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3 (Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

In embodiments, the luminescent material may alternatively or additionally comprise one or more of $M_2S_5N_8:Eu^{2+}$ and/or $MAlSiN_3:Eu^{2+}$ and/or $Ca_2AlSi_3O_2N_5:Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca). Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by Eu 2+). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca).

Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO (Y$_2$SiO$_5$: Ce$^{3+}$), or similar compounds, or BAM (BaMgAl$_{10}$O$_{17}$: Eu$^{2+}$), or similar compounds.

The term "luminescent material" herein especially relates to inorganic luminescent materials.

Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS$_2$) and/or silver indium sulfide (AgInS$_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

Further, the system may comprise first polarization optics, second polarization optics, and third optics. Herein, the term "optics" may refer to a single optical element or to a plurality of optical elements. For instance a (functional) combination of a polarizer and a half-waveplate may be indicated as optics, though the polarizer as such, or the half-waveplate as such, may also be indicated as optics, respectively. Likewise, two or more (functionally coupled) beam combiners may be indicated as optics and each individual beam combiner may be indicated as optics, respectively.

Especially, in embodiments the first polarization optics may be configured downstream of the first luminescent material and upstream of the third optics. In embodiments, the first polarization optics are configured to provide first luminescent material light having a first polarization.

Especially, the first polarization optics may comprise a reflective polarizer.

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

Further, especially in embodiments the second polarization optics may be configured downstream of the second luminescent material and upstream of the third optics. In embodiments, the second polarization optics may be configured to provide second luminescent material light having a second polarization different from the first polarization.

Especially, the first polarization optics may comprise a reflective polarizer.

Further, especially in embodiments the first polarization and the second polarization are selected from s polarization and p polarization.

Further, especially in embodiments the third optics may be configured to combine in an operational mode of the light generating system the polarized first luminescent material light and the polarized second luminescent material light.

Especially, the third optics may in embodiments comprise a reflective polarizer. The third optics may combine the different beams of light having different polarization into a single beam, as one beam having a first reflection may be reflected in a first direction and a second beam having a second reflection may be transmitted in the (same) first direction.

Especially, a reflective polarizer(s) may in embodiments comprise a transmissive polarizer coated with one or more, especially various, reflective films. Especially, a reflective polarizer may be configured transmit a desired polarization and reflect the rest. In embodiments, a reflective polarizer may comprise a wire grid, and/or may be based on the Brewster's angle, and/or interference effects. The Brewster's angle is the angle at which, based on the Fresnel equations, only s-polarized light is reflected. Because the p-polarized light is not reflected while the s-polarized light is at least partly reflected, the transmitted light may be enriched in p-polarization. An advantage of using a reflective polarizer may be relatively low-cost, because they are e.g. applied in displays/projectors in large area and/or high volumes. Further, when using a reflective polarizer, the part of the light that is not transmitted, but reflected, may be reused. For instance, the reflected light may be reabsorbed by the luminescent material and/or may be changed in polarization e.g. due to reflections. Hence, assuming e.g. reflection of s-polarized right, in embodiments s-polarized light may at least partly be re-converted into reconverted light having p- and s-polarizations. The reconverted light with a p polarized light can escape through the polarizer and thus enriched p-polarization light may be obtained. This may also apply to a reflective polarizer configured to transmit s-polarized light (but then p-polarized light is reflected and may be reconverted).

As indicated above, at least one of the first polarization optics and the second polarization optics may comprise a reflective polarizer. More especially, in embodiments each of the first polarization optics and the second polarization optics may comprise a (respective) reflective polarizer.

In specific embodiments, one of the first polarization optics and the second polarization optics may further comprise a polarization shifter. Especially, the polarization shifter may be configured to shift the polarization from the first polarization to the second polarization or from the second polarization to the first polarization. Especially, the polarization shifter may be configured downstream of the (respective) reflective polarizer. For instance, in this way the same type of reflective polarizers may be used, such as based on the Brewster angle, though other options may also be possible. The (respective) luminescent material light generated would then be polarized with the same polarizations, like s-polarizations. For one beam, however, the polarization is changed with the polarization shifter, such as from the s-polarization to the p-polarization. To this end, in embodiments the polarization shifter may comprise a half-waveplate. Especially, a waveplate or retarder is an optical device that alters the polarization state of a light wave travelling through it. A half-waveplate, which may especially be configured to shift the polarization direction of linearly polarized light.

Above, (non-limiting) embodiments of luminescent materials have been provided. Especially, in embodiments the first luminescent material and/or the second luminescent material may comprise a luminescent material of the type $A_3B_5O_{12}$:Ce, wherein A comprises one or more of Y, La, Gd, Tb and Lu, and wherein B comprises one or more of Al, Ga, In and Sc. Hence, in specific embodiments the first luminescent material may comprise a luminescent material of the type $A_3B_5O_{12}$:Ce, wherein A comprises one or more of Y, La, Gd, Tb and Lu, and wherein B comprises one or more of Al, Ga, In and Sc. In yet further specific embodiments (also) the second luminescent material may comprise luminescent material of the type $A_3B_5O_{12}$:Ce, wherein A comprises one or more of Y, La, Gd, Tb and Lu, and wherein B comprises one or more of Al, Ga, In and Sc.

These garnet type of luminescent material may be relatively stable and relatively highly efficient luminescent material. Further, these type of luminescent materials may be able to withstand high intensities of device light. Further, these garnet type of luminescent materials may have tunable emissions by varying cations (and anions) and their relative amounts. It may even be possible to tune the emission band by tuning the activator concentration, especially of cerium. The higher the cerium content, the more the emission band shifts into the red direction.

Hence, in specific embodiments the first luminescent material and the second luminescent material (only) differ in cerium content. Hence, the relative amount of A cations of Y, La, Gd, Tb and Lu may be the same and the relative amount of B cations Al, Ga, In and Sc may be the same. However, other embodiments may also be possible (see also above). Note that the phrases "the relative amount of A cations" and "the relative amount of B cations" may respectively also refer to embodiments wherein A only comprises e.g. Y (thus not taking into account Ce) and/or B only comprises Al. Alternatively or additionally, the emission band may be controlled by varying one or more of the composition of A and the composition of B (see also examples above).

As indicated above, the luminescent material light of the first luminescent material and the luminescent material light of the second luminescent material may in embodiments have essentially identical spectral power distributions, and would then have essentially identical centroid wavelengths, but may, however, in other embodiments have different spectral power distributions and thus have different centroid wavelengths. When the spectral power distribution are different, in embodiments a larger color gamut of the system light may be obtained.

In specific embodiments, the first luminescent material light may have a first centroid wavelength $\lambda_{c1}$, and the second luminescent material light may have a second centroid wavelength $\lambda_{c2}$, wherein $|\lambda_{c1}-\lambda_{c2}| \geq 10$ nm. In specific embodiments, $|\lambda_{c1}-\lambda_{c2}| \geq 15$ nm, more especially $|\lambda_{c1}-\lambda_{c2}| \geq 20$ nm. Yet, in specific embodiments, $|\lambda_{c1}-\lambda_{c2}| \geq 25$ nm.

The term "centroid wavelength", also indicated as kc, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c = \Sigma \lambda * I(\lambda)/(\Sigma I(\lambda))$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

It may, however, also be desirable that the centroid wavelengths are not too differing. For instance, when using a reflective polarizer as beam combiner, it may be desirable that the centroid wavelengths are not too different. Especially, in embodiments $|\lambda_{c1}-\lambda_{c2}| \leq 150$ nm, such as especially $|\lambda_{c1}-\lambda_{c2}| \leq 100$ nm. In specific embodiments, $|\lambda_{c1}-\lambda_{c2}| \leq 80$ nm.

In specific embodiments, 10 nm$\leq |\lambda_{c1}-\lambda_{c2}| \leq 150$ nm, such as 10 nm$\leq |\lambda_{c1}-\lambda_{c2}| \leq 100$ nm, like 15 nm$\leq |\lambda_{c1}-\lambda_{c2}| \leq 100$ nm. Therefore, in specific embodiments 25 nm$\leq |\lambda_{c1}-\lambda_{c2}| \leq 100$ nm, such as 25 nm$\leq |\lambda_{c1}-\lambda_{c2}| \leq 80$ nm.

The luminescent material (element) may be configured in the reflective mode or the transmissive mode. Both may be configured in the reflective mode, or both may be configured in the transmissive mode, or one may be configured in the reflective mode and one may be configured in the transmissive mode.

The luminescent material may be configured in the reflective mode or in the transmissive mode. In the transmissive mode, it may be relatively easy to have light source light admixed in the luminescent material light, which may be useful for generating the desirable spectral power distribution. In the reflective mode, thermal management may be more easy, as a substantial part of the luminescent material may be in thermal contact with a thermally conductive element, like a heatsink or heat spreader. In the reflective mode, a part of the light source light may in embodiments be reflected by the luminescent material light and may be admixed in the luminescent material light.

Hence, in specific embodiments at least one of the first luminescent material element and the second luminescent material element may be configured in a reflective configuration. Especially, in such embodiments a first side of the at least one of the first luminescent material element and the second luminescent material element is configured in the light receiving relationship with the one or more light generating devices (of the one or more light generating devices). Further, especially in embodiments a reflector may be configured at a second side of the at least one of the first luminescent material element and the second luminescent material element, especially in embodiments at the second sides of the respective first luminescent material element and second luminescent material element. In this way, the efficiency may be improved. In specific embodiments, both the first luminescent material element and the second luminescent material element are configured in a reflective configuration.

The reflector may in embodiments be provided by a heatsink or heat spreader. In other embodiments, the reflector may be a reflective layer on a heatsink or on a heat spreader. Especially, the reflector may be provided by a thermally conductive material or by a reflective layer on a thermally conductive material.

A thermally conductive element especially comprise thermally conductive material. A thermally conductive material may especially have a thermal conductivity of at least about 20 W/m/K, like at least about 30 W/m/K, such as at least about 100 W/m/K, like especially at least about 200 W/m/K. In yet further specific embodiments, a thermally conductive material may especially have a thermal conductivity of at least about 10 W/m/K.

In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

Heatsinks are known in the art. The term "heatsink" (or heatsink) may especially be a passive heat exchanger that transfers the heat generated by device, such as an electronic device or a mechanical device, to a fluid (cooling) medium, often air or a liquid coolant. Thereby, the heat is (at least partially) dissipated away from the device. A heatsink is especially designed to maximize its surface area in contact with the fluid cooling medium surrounding it. Hence, especially a heatsink may comprise a plurality of fins. For instance, the heatsink may be a body with a plurality of fins extending thereof.

A heatsink especially comprises (more especially consists of) a thermally conductive material. The term "heatsink" may also refer to a plurality of (different) heatsinks.

The reflector may in embodiments be a reflective coating, such as a coating of one or more of $TiO_2$, $BaSO_4$, or $Al_2O_3$, or other materials known to a person skilled in the art.

In embodiments, the luminescent material element may be thermally coupled with the thermally conductive element, such as heatsink, but may not be optically coupled. The first and second luminescent element may be thermally coupled to a single heatsink, or may alternatively be both thermally coupled to a separate heatsink.

When elements are in optical contact or optically coupled, they may in embodiments be in physical contact with each other or may in other embodiments be separated from each other with e.g. a (thin) layer of optical material, such as an optical glue, or other optically transparent interface material, e.g. having a thickness of less than about 1 mm, preferably less than 100 µm. When no optically transparent interface material is applied, the (average) distance between two elements being in optical contact may especially be about at maximum the wavelength of relevance, such as the wavelength of an emission maximum. For visible wavelengths, this may be less than 1 µm, such as less than 0.7 µm, and for blue even smaller. Hence, when optical coupling is desired, an optically transparent interface material may be applied. In yet other embodiments, when no optically transparent interface material is applied, the average distance between two elements being in optical contact may especially be about at maximum the wavelength of relevance, such as the wavelength of an emission maximum. Hence, when optical contact is desired, there may be physical contact. However, even in such embodiments there may be a non-zero average distance, but then equal to or lower than the wavelength of interest, such as a centroid wavelength of the laser radiation.

As indicated above, in alternative (or additional) embodiments, at least one of the first luminescent material and the second luminescent material may be configured in a transmissive configuration.

Downstream of the third optics, the light may comprise the first luminescent material light and/or the second luminescent material light. Both are polarized, but may have different polarizations. The light that escapes from the system, which is herein also indicates as system light, may thus be polarized. However, the system light is not necessarily polarized. In specific embodiments, the system may further comprise depolarization optics configured downstream of the third optics. For instance, the depolarization optics may comprise a light scattering (optical) component, or a component having a pattern of halve lambda areas (or pixels).

As indicated above, in embodiments the light generating system may be configured to generate system light. In an operational mode of the light generating system, the system light comprises the first luminescent material light and the second luminescent material light. In an operational mode, the system light may be white light (see also below).

As indicated above, the first luminescent material light and the second luminescent material light may have essentially the same spectral power distribution. Especially, however, in embodiments they may have different spectral power distributions. For instance, in embodiments the first luminescent material light and the second luminescent material light may have different color points (see also above). In specific embodiments the first luminescent material light and the second luminescent material light may have different correlated color temperatures, such as differing at least about 500 K. In specific embodiments, correlated color temperatures (CCT) of a first type of light and a second type of light may be different when the respective CCTs of the first type of light and the second type of light differ with at least 500 K, such as at least 750 K, like in embodiments at least 1000 K.

As indicated above, the system comprises a first luminescent material element and a second luminescent material element. In embodiments, the first luminescent material element and a second luminescent material element may be irradiated by the same one or more light generating devices (but especially in embodiments via different beams, such as when using a beam splitter). In other embodiments, the first luminescent material element and the second luminescent material element may be irradiated by different sets of each one or more light generating devices.

In further embodiments, the system may comprise a first luminescent material element, a second luminescent material element, and one or more further luminescent material elements. In embodiments, the first luminescent material element, the second luminescent material element, and one or more of the one or more further luminescent material elements may be irradiated by the same one or more light generating devices (but especially in embodiments via different beams, such as when using a beam splitter). In other embodiments, the first luminescent material element, the second luminescent material element, and one or more of the one or more further luminescent material elements may be irradiated by the same one or more light generating devices may be irradiated by different sets of each one or more light generating devices. One or more of the first luminescent material element, the second luminescent material element, and one or more of the one or more further luminescent material elements may be configured to provide luminescent material light having different spectral power distributions.

In specific embodiments, each of the luminescent material elements may be irradiated with respective light generating devices. Especially in this way it may be possible to control the spectral power distribution of the system light.

Further, it may also be possible that the system comprises in embodiments an additional light generating device. This additional light generating device is indicated as second light generating device. The second light generating device may especially be configured to generate second device light. The second light generating device may be different from the one or more light generating devices. Alternatively, it may be the same as one or more of the light generating devices, but may be configured to bypass the luminescent materials with its second device light. The second light generating device may be used to mix, in an operational mode, at least part of its second device light in the system light.

Hence, in embodiments the light generating system may further comprise a second light generating device, configured to generate second device light, wherein in an operational mode of the light generating system the system light comprises the second device light.

In an operational mode of the system, the system light may be white light (see also above).

As indicated above, the light generating system may comprise a control system, or may be functionally coupled to a control system. Further, the light generating system may be configured to operate in a single operational mode or may be configured to allow two or more different operational mode. Especially in the latter embodiments, the light generating system may comprise a control system, or may be functionally coupled to a control system.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Wifi, ZigBee, BLE or WiMax, or another wireless technology.

The system, or apparatus, or device may execute an action in a "mode" or "operation mode" or "operational mode" or "mode of operation" or "control mode". Likewise, in a method an action or stage, or step may be executed in a "mode" or "operation mode" or "operational mode" or "mode of operation" or "control mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N)IR" is applied, to refer to in general IR, and in specific embodiments to NIR.

The term white light, and similar terms, herein, is known to the person skilled in the art. It especially relates to light having a correlated color temperature (CCT) between about 1800 K and 20000 K, like at least about 2000 K, especially in the range of 2700-20000 K, for general lighting especially in the range of about 2000-6700 K, such as 2700-6500 K, and for backlighting purposes especially in the range of about 6500 K and 20000 K, and especially within about 15 SDCM (standard deviation of color matching) from the BBL (black body locus), especially within about 10 SDCM from the BBL, even more especially within about 5 SDCM from the BBL.

The terms "violet light" or "violet emission" especially relates to light having a wavelength in the range of about 380-440 nm. The terms "blue light" or "blue emission" especially relate to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-590 nm. The terms "orange light" or "orange emission" especially relate to light having a wavelength in the range of about 590-620. The terms "red light" or "red emission" especially relate to light having a wavelength in the range of about 620-750 nm.

The term "cyan" may refer to one or more wavelengths selected from the range of about 490-520 nm. The term "amber" may refer to one or more wavelengths selected from the range of about 585-605 nm, such as about 590-600 nm.

The terms "visible" light or "visible emission" refer to radiation (herein especially indicated as "light") having a wavelength in the range of about 380-780 nm. Herein, UV (ultraviolet) may especially refer to a wavelength selected from the range of 190-380 nm, though in specific embodiments other wavelengths may also be possible. Herein, IR (infrared) may especially refer to radiation having a wavelength selected from the range of 780-3000 nm, such as 780-2000 nm, e.g. a wavelength up to about 1500 nm, like a wavelength of at least 900 nm, though in specific embodiments other wavelengths may also be possible. Hence, the term IR may herein refer to one or more of near infrared (NIR (or IR-A)) and short-wavelength infrared (SWIR (or IR-B)), especially NIR.

In an embodiment, the light generating system further comprising a first λ/4 plate configured downstream of the first polarization optics and upstream of the first luminescent material or configured downstream of the first luminescent material and upstream the reflector (reflective configuration) or dichroic (transmissive configuration). In a further embodiment, the light generating system further comprises a first λ/4 plate configured downstream of the second polarization optics and upstream of the second luminescent material or configured downstream of the second luminescent material and upstream of the reflector (reflective configuration) or dichroic (transmissive configuration). As a result, the optical efficiency of the system is improved as light is being recycled that otherwise may be lost.

In an embodiment, the first luminescent material element and/or the second luminescent material element are substantially transparent.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. The light generating system may also be used for disinfection or optical wireless communication. Hence, in an aspect the invention also provides a light generating device selected from the group of a lamp, a luminaire, a projector device, a disinfection device, and an optical wireless communication device, comprising the light generating system as defined herein.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 2A-2B schematically depict some embodiments and aspects;

DETAILED DESCRIPTION OF THE EMBODIMENTS

Figure 1:
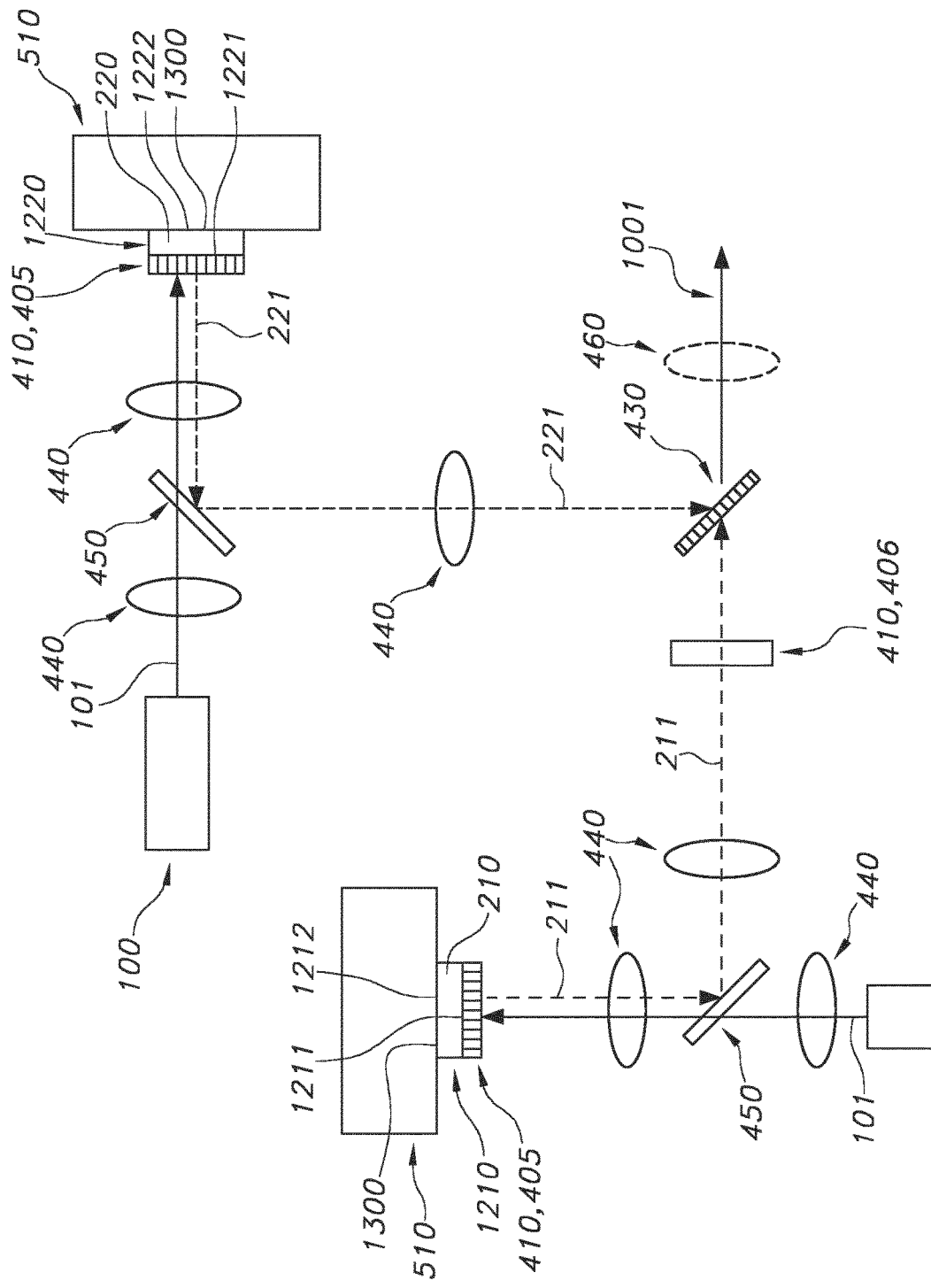
FIG. 1 schematically depicts an embodiments and variations.

High brightness light sources can be used in applications such as projection, stage-lighting, spot-lighting and automotive lighting. For this purpose, laser-phosphor technology can be used wherein a laser provides laser light and a remote phosphor converts laser light into converted light. The phosphor may in embodiments typically arranged on or inserted in a heatsink for improved thermal management and thus higher brightness. The brightness may be limited by (thermal and photo) quenching of the phosphor.

When garnet phosphors with high chemical, thermal and light stability are used for producing white light, in the absence of enough red emission only low CRI white light may be obtained. In order to increase CRI the use of red emitting phosphors in combination with garnet phosphors is suggested. However, red emitting phosphors may be susceptible for quenching.

Furthermore, in order to obtain superior quality of white light very broad emission peaks approaching full spectrum lighting may be needed.

In embodiments, herein a high brightness light source is proposed providing unpolarized light using twin phosphors emitting polarized light. The light source may comprise a laser light source emitting laser light, and a wavelength converting structure. The wavelength converting structure may comprise (i) a first wavelength converter at a first location comprising a first luminescent material converting laser light into first converted light and (ii) a second wavelength converter at a second location, different from said first location, comprising a second luminescent material converting laser light into second converted light. The first wavelength converter further may comprise a first reflective polarizer at a first light exit for providing polarized first converted light and the second wavelength converter further may comprise a second reflective polarizer at its second light exit for providing polarized second converted light. The polarized first converted light and the polarized second converted light may be combined by a third reflective polarizer. The polarized first converted light and the polarized second converted light may in embodiments have the same color (e.g. both green/yellow or both orange/red or both blue). The obtained effect may be a higher brightness.

In specific embodiments, the polarized first converted light may be shifted with respect to the polarized second converted light. This can be obtained e.g. by (i) excitation of the first luminescent material with first laser light and excitation of the second luminescent material with second laser light different from said first laser light, and/or (ii) using a dichroic mirror for reflecting the lower part of the first or second converted light which leads to reabsorption, and/or (iii) using different amounts of dopant in first luminescent material and second luminescent material. The obtained effect may be a broader emission peak. The difference in peak wavelength may be in the range from 10 to 50 nm.

In embodiments, the laser light may be UV and/or blue light. In embodiments, the first and second luminescent material is of the type $A_3B_5O_{12}$:Ce, wherein A comprises one or more of Y, La, Gd, Tb and Lu, and wherein B comprises one or more of Al, Ga, In, Sb and Sc.

The phosphor can be used in the reflective and/or transmissive modes. In embodiments, the phosphors may provide full conversion.

In embodiments, such light source can be used in combination with a second light source and, optionally, a third light source emitting different colors to obtain white light having a high CRI. The second/third light source may be a laser or a phosphor converting laser light.

However, other embodiments may also be possible.

FIG. 1 schematically depicts an embodiment of a light generating system 1000 comprising one or more light generating devices 100, a first luminescent material element 1210, a second luminescent material element 1220, first polarization optics 410, second polarization optics 420, and third optics 430. The one or more light generating devices 100 are especially configured to generate device light 101.

The first luminescent material element 1210 comprises a first luminescent material 210 configured in a light receiving relationship with one or more of the one or more light generating devices 100 and configured to convert at least part of the received device light 101 into first luminescent material light 211. The second luminescent material element 1220 comprises a second luminescent material 220 configured in a light receiving relationship with one or more of the one or more light generating devices 100 and configured to convert at least part of the received device light 101 into second luminescent material light 221.

The first polarization optics 410 are configured downstream of the first luminescent material 210 and upstream of the third optics 430. Especially, the first polarization optics 410 are configured to provide first luminescent material light 211 having a first polarization. The second polarization optics 420 are configured downstream of the second luminescent material 220 and upstream of the third optics 430. Especially, the second polarization optics 420 are configured to provide second luminescent material light 221 having a second polarization different from the first polarization. The third optics 430 are configured to combine in an operational mode of the light generating system 1000 the polarized first luminescent material light 211 and the polarized second luminescent material light 221. In embodiments, the third optics 430 comprises a reflective polarizer.

In embodiments, at least one of the first polarization optics 410 and the second polarization optics 420 may comprises a reflective polarizer 405. More especially, each of the first polarization optics 410 and the second polarization optics 420 may comprise a (respective) reflective polarizer 405.

Further, one of the first polarization optics 410 and the second polarization optics 420 further comprises a polarization shifter 406. The polarization shifter 406 is configured to shift the polarization from the first polarization to the second polarization or from the second polarization to the first polarization. The polarization shifter 406 is configured downstream of the (respective) reflective polarizer 405. The polarization shifter may be a λ/2 plate (half wave plate) or alternative a λ/4 plate (quarter wave plate). In case of a λ/4 plate the light will have to pass the plate twice in order to shift from the first polarization to the second polarization, or vice versa. In embodiments, the polarization shifter may be positioned both downstream the respective polarizer and downstream the respective luminescent material element.

Here, the first polarization optics 410 comprises the reflective polarizer 405 and the polarization shifter 406. However, alternatively the second polarization optics 420 could comprise the reflective polarizer 405 and the polarization shifter 406.

In embodiments, the first luminescent material 210 comprise a luminescent material of the type $A_3B_5O_{12}$:Ce, wherein A comprises one or more of Y, La, Gd, Tb and Lu, and wherein B comprises one or more of Al, Ga, In and Sc. Further, in specific embodiments the second luminescent material 220 comprise luminescent material of the type $A_3B_5O_{12}$:Ce, wherein A comprises one or more of Y, La, Gd, Tb and Lu, and wherein B comprises one or more of Al, Ga, In and Sc. Yet further in specific embodiments, the first luminescent material 210 and the second luminescent material 220 differ in cerium content. Yet further, in embodiments, the first luminescent material light 211 has a first centroid wavelength $\lambda_{c1}$, and wherein the second luminescent material light 221 has a second centroid wavelength $\lambda_{c2}$, wherein $|\lambda_{c1}-\lambda_{c2}|\geq 10$ nm. Especially, in embodiments 10 nm$\leq|\lambda_{c1}-\lambda_{c2}|\leq 100$ nm.

In specific embodiments, at least one of the first luminescent material element 1210 and the second luminescent material element 1220 comprises a ceramic body. However, other embodiments may also be possible.

In embodiments, at least one of the first luminescent material element 1210 and the second luminescent material element 1220 may be configured in a reflective configuration, wherein a first side 1211,1221 of the at least one of the first luminescent material element 1210 and the second luminescent material element 1220 is configured in the light receiving relationship with the one or more light generating devices 100 (of the one or more light generating devices 100). Here, in FIG. 1 both the first luminescent material element 1210 and the second luminescent material element 1220 are configured in a reflective configuration. In embodiments, a reflector 1300 may be configured at a second side 1212,1222 of the at least one of the first luminescent material element 1210 and the second luminescent material element 1220.

Reference 510 indicates a thermally conductive body, such as a heatsink.

Reference 440 refers to (further) optics, like lenses.

Reference 450 refers to optics which may comprise e.g. a dichroic reflector or a dichroic mirror. Device light may be transmitted or reflected and luminescent material light may be reflected or transmitted (respectively).

Reference 1001 refers to system light.

The one or more light generating devices 100 comprise one or more of lasers and superluminescent diodes.

Especially, the light generating system 1000 is configured to generate system light 1001. In an operational mode of the light generating system 1000 the system light 1001 comprises the first luminescent material light 211 and the second luminescent material light 221.

In specific embodiments, the light generating system 1000 may further optionally comprise depolarization optics 460 configured downstream of the third optics 430.

FIG. 2A schematically depicts some embodiments, with embodiment I indicating a reflective configuration, embodiment II indicating a reflective configuration including a dichroic 417, and embodiment III indicating a transmissive configuration, also with in this embodiment a dichroic 417. FIG. 2A, embodiment III, schematically depicts an embodiment wherein at least one of the first luminescent material 210 and the second luminescent material 220 is configured in a transmissive configuration. Here, by way of example the embodiment is depicted in relation to the first luminescent material 210.

The dichroic 417 may in embodiments be transmissive for specific wavelengths and reflective for other wavelengths. For instance, the dichroic 417 may be transmissive for the device light but reflective for converted light. Referring to FIG. 2A, embodiment I, an embodiment is shown wherein no dichroic is used. Referring to FIG. 2A, embodiments III, an embodiment is shown wherein a dichroic is used to transmit laser light but reflect converted light. Referring to FIG. 2A, embodiments II, the dichroic may be transparent for the device light and may be partially reflective for the converted light (especially in embodiments to shift the peak of the polarized converted light a bit).

FIG. 2B schematically depicts an embodiment of the light generating system 1000, further comprising a second light generating device 120, configured to generate second device light 121, wherein in an operational mode of the light generating system 1000 the system light 1001 comprises the second device light 121. Reference 1430 refers to a beam combiner. In embodiments, the beam combiner may comprise dichroics (such as (one or more) dichroic mirrors or dichroic reflectors).

Figure 3:
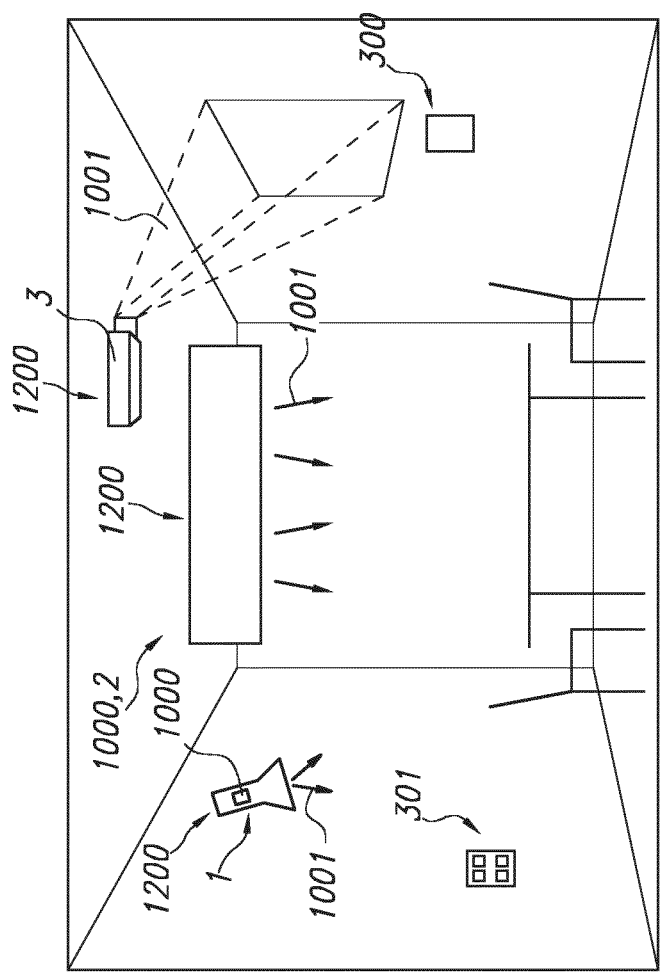
FIG. 3 shows some applications.

FIG. 3 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000.

Figure 4A:
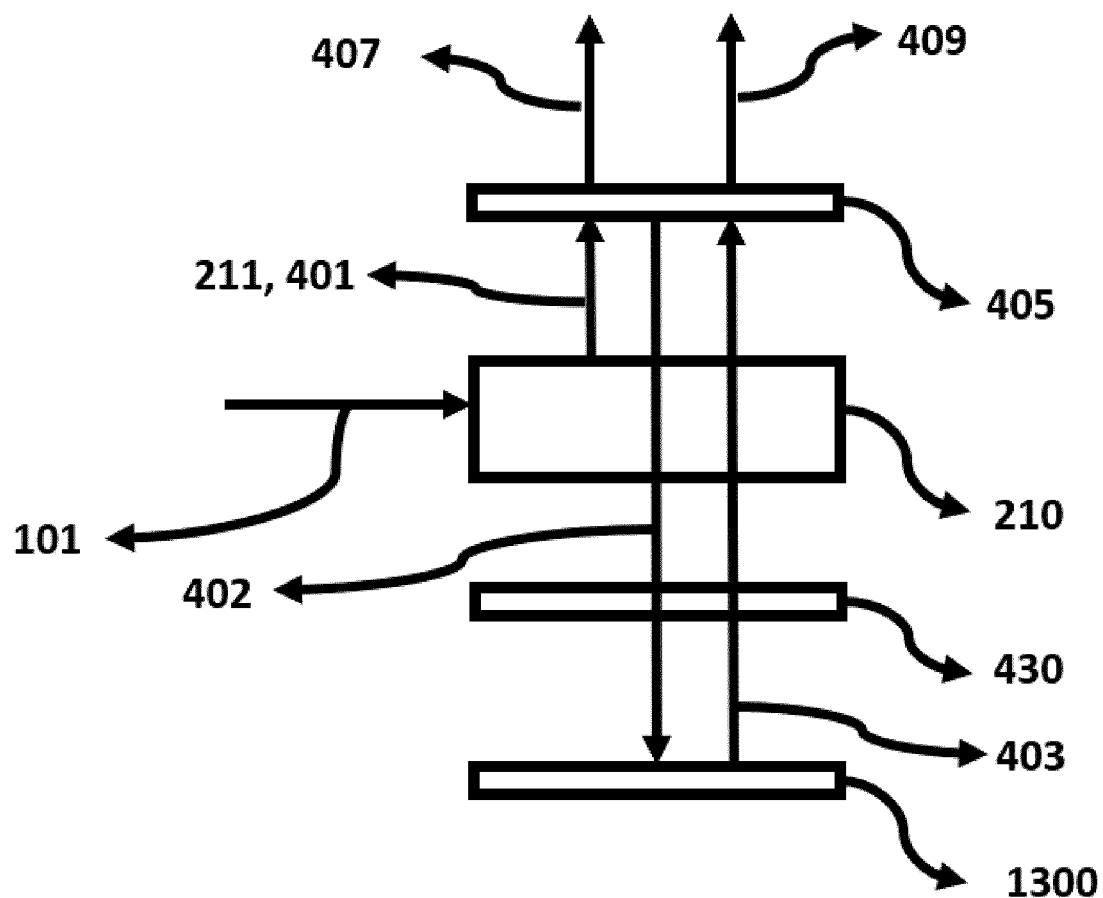
FIGS. 4A-4B schematically depict some embodiments and aspects. The schematic drawings are not necessarily to scale.
Figure 4B:
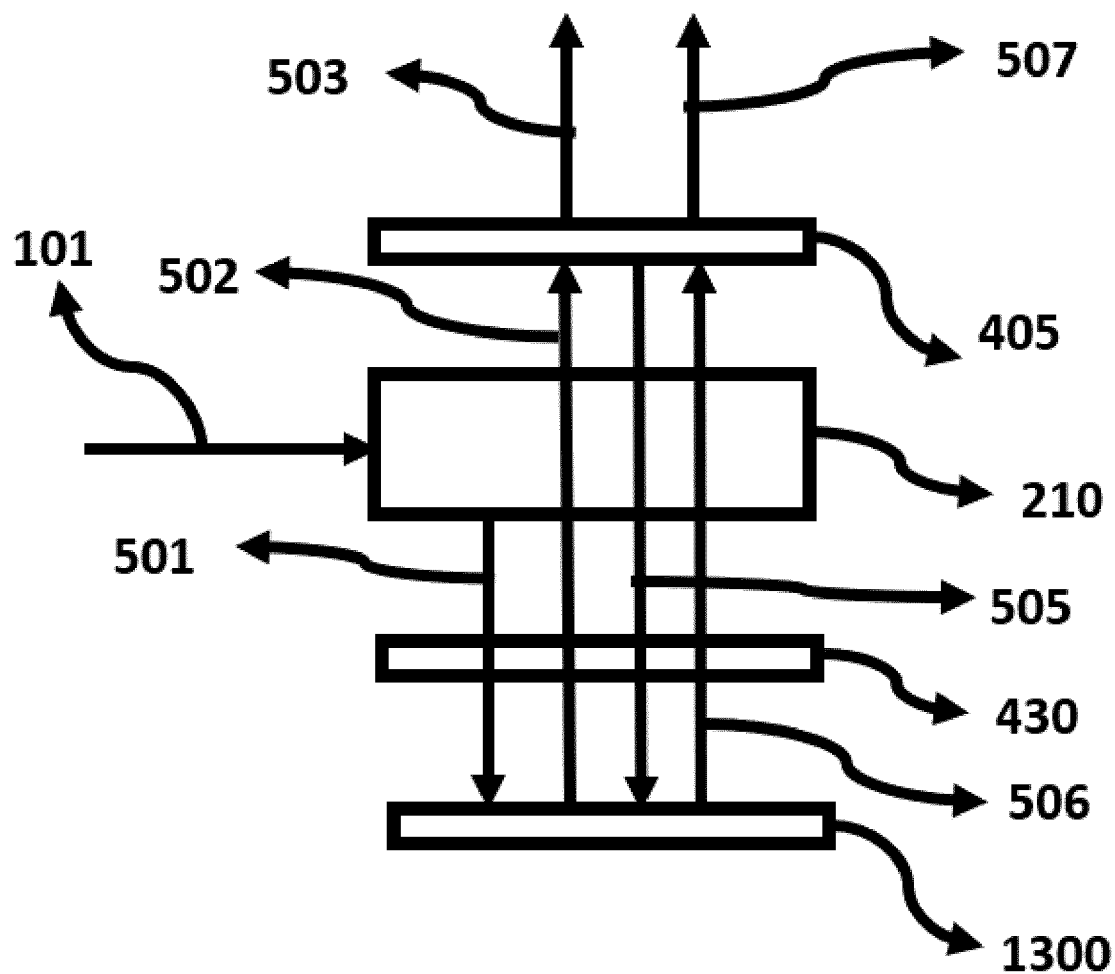

FIG. 4A schematically depicts some further embodiments of a light generating system 1000, further comprising a first $\lambda/4$ plate 430 configured downstream of the first luminescent material 210 and upstream of the reflector 1300 (reflective configuration). Upon excitation of the first luminescent material 210 sidewards by device light 101, the first luminescent material light 211 that is directed toward the first polarization optics 405 comprising a linear reflective polarizer that reflects p polarized light, light having an s polarization passes through the first polarization optics 405 as light beam 407. Light from light beam 401 having an p polarization is reflected as light beam 402. The light beam 402 is directed toward the first $\lambda/4$ plate 430 and after passing the first $\lambda/4$ plate 430 the light of light beam 402 is right-handed circularly polarized light. Upon reflection of the light by the reflector 1300, light beam 403 is generated comprising left-handed circularly polarized light. Light beam 403 passes through the first $\lambda/4$ plate 430 and is converted to s (linear) polarized light that subsequently passes through the first polarization optics 405 as light beam 409. In this way, the optical efficiency of the light generating system 1000 is improved. Alternatively, the first $\lambda/4$ plate is configured downstream of the first polarization optics 405 and upstream of the first luminescent material 210 (reflective configuration), not shown in FIG. 4A. In further embodiments, not shown in FIG. 4A, the light generating system 1000 further comprising a second $\lambda/4$ plate configured downstream of the second luminescent material 220 and upstream of the reflector 1300 or alternatively configured downstream of the second polarization optics 420 and upstream of the second luminescent material 220 (reflective configuration). Referring to FIG. 4B, schematically an embodiment of a light generating system 1000 is depicted identical to that of FIG. 4A, showing the first luminescent material light 211 that is directed toward the first $\lambda/4$ plate 430 as unpolarized light beam 501, which passes through the first $\lambda/4$ plate 430 and is reflected by the reflector 1300 as light beam 502 toward the first polarization optics 405 that comprises a linear reflective polarizer that reflects p polarized light. The light of light beam 502 having an s polarization passes through the first polarization optics 410 as light beam 503, whereas light of light beam 502 having an p polarization is reflected as light beam 505. The light beam 505 is directed toward the first $\lambda/4$ plate 430 and after passing the first $\lambda/4$ plate 430 the light of light beam 505 is right-handed circularly polarized light. Upon reflection of the light by the reflector 1300, light beam 506 is generated comprising left-handed circularly polarized light. Light beam 506 passes through the first $\lambda/4$ plate 430 and is converted to s (linear) polarized light that subsequently passes through the first polarization optics 405 as light beam 507. Referring to FIGS. 4A and 4B, in this way the optical efficiency of the light generating system 1000 is improved as light is being recycled that otherwise may have been lost.

Referring to FIGS. 4A and 4B, in an embodiment, the first luminescent material element 1210 is substantially transparent. In a further embodiment, the second luminescent material element 1220 is substantially transparent.

In a further embodiment, the thickness of the first and/or second luminescent material element 1210, 1220, respectively, and/or the concentration of the first and/or second luminescent material 210, 220, respectively, is chosen such that not all device light 101 is converted by the luminescent material upon a single pass of the device 101 through the first or second luminescent material element, respectively. For example, in a single pass 80% of the device light 101 is converted, preferably 90%, more preferably 95%.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising one or more light generating devices, a first luminescent material element, a second luminescent material element, first polarization optics, second polarization optics, and third optics, wherein:
   the one or more light generating devices are configured to generate device light;
   the first luminescent material element comprises a first luminescent material configured in a light receiving relationship with one or more of the one or more light generating devices and configured to convert at least part of the received device light into first luminescent material light;
   the second luminescent material element comprises a second luminescent material configured in a light receiving relationship with one or more of the one or more light generating devices and configured to convert at least part of the received device light into second luminescent material light;
   the first polarization optics are configured downstream of the first luminescent material and upstream of the third optics; wherein the first polarization optics are configured to provide first luminescent material light having a first polarization;
   the second polarization optics are configured downstream of the second luminescent material and upstream of the third optics; wherein the second polarization optics are configured to provide second luminescent material light having a second polarization different from the first polarization; and
   the third optics are configured to combine in an operational mode of the light generating system the polarized first luminescent material light and the polarized second luminescent material light; and wherein the third optics comprises a reflective polarizer;
   wherein each of the first polarization optics and the second polarization optics comprises a reflective polarizer;
   wherein the first luminescent material light has a first centroid wavelength $\lambda_{c1}$, and wherein the second luminescent material light has a second centroid wavelength $\lambda_{c2}$, wherein $|\lambda_{c1}-\lambda_{c2}| \leq 80$ nm;
   wherein the one or more light generating devices comprise one or more lasers configured to generate device light having one or more wavelengths in the UV and visible wavelength range;
   wherein the first luminescent material element and second luminescent material element are configured spatially separated, and wherein the first and second luminescent material element are configured to convert one or more of UV radiation and blue radiation into visible light;
   wherein the first luminescent material element and/or the second luminescent material element are thermally coupled with a thermally conductive element; and
   wherein at least one of the first luminescent material element and the second luminescent material element comprises a ceramic body.

2. The light generating system according to claim 1, wherein the first luminescent material comprises a luminescent material of the type $A_3B_5O_{12}$:Ce, wherein A comprises one or more of Y, La, Gd, Tb and Lu, and wherein B comprises one or more of Al, Ga, In and Sc and/or wherein the second luminescent material comprises luminescent material of the type $A_3B_5O_{12}$:Ce, wherein A comprises one or more of Y, La, Gd, Tb and Lu, and wherein B comprises one or more of Al, Ga, In and Sc.

3. The light generating system according to claim 1, wherein the first luminescent material and the second luminescent material differ in cerium content.

4. The light generating system according to claim 1, wherein 10 nm $\leq |\lambda_{c1}-\lambda_{c2}| \leq 80$ nm.

5. The light generating system according to claim 1, wherein at least one of the first luminescent material element and the second luminescent material element is configured in a reflective configuration, wherein a first side of the at least one of the first luminescent material element and the second luminescent material element is configured in the light receiving relationship with the one or more light generating devices, and wherein a reflector is configured at a second side of the at least one of the first luminescent material element and the second luminescent material element.

6. The light generating system according to claim 1, wherein at least one of the first luminescent material element and the second luminescent material element is configured in a transmissive configuration wherein a first side of the at least one of the first luminescent material element and the second luminescent material element is configured in the light receiving relationship with the one or more light generating devices, and wherein a dichroic is configured at the first side of the at least one of the first luminescent material element and the second luminescent material element, wherein the dichroic is transparent for the device light and reflective for the converted light.

7. The light generating system according to claim 1, wherein one of the first polarization optics and the second polarization optics further comprises a polarization shifter, wherein the polarization shifter is configured to shift the polarization from the first polarization to the second polarization or from the second polarization to the first polarization, and wherein the polarization shifter is configured downstream of the reflective polarizer.

8. The light generating system according to claim 1, further comprising a first $\lambda/4$ plate configured downstream of the first polarization optics and upstream of the first luminescent material or configured downstream of the first luminescent material and upstream the reflector, and/or further comprising a first $\lambda/4$ plate configured downstream of the second polarization optics and upstream of the second luminescent material or configured downstream of the second luminescent material and upstream of the reflector.

9. The light generating system according to claim 1, wherein the first luminescent material element and the second luminescent material element comprises a substantially transparent ceramic body.

10. The light generating system according to claim 1, wherein both the first luminescent material element and the second luminescent material element are configured in a reflective configuration.

11. The light generating system according to claim 6, wherein both the first luminescent material element and the second luminescent material element are configured in a transmissive configuration.

12. The light generating system according to claim 1, further comprising depolarization optics configured downstream of the third optics.

13. The light generating system according to claim 1, wherein the light generating system is configured to generate system light, wherein in an operational mode of the light generating system the system light comprises the first luminescent material light and the second luminescent material light.

14. The light generating system according to claim 13, further comprising a second light generating device, configured to generate second device light, wherein in an operational mode of the light generating system the system light comprises the second device light.

15. A light generating device selected from the group of a lamp, a luminaire, a projector device, a disinfection device, and an optical wireless communication device, comprising the light generating system according to claim 1.

* * * * *